US011003717B1

United States Patent
Eswaran et al.

(10) Patent No.: US 11,003,717 B1
(45) Date of Patent: May 11, 2021

(54) ANOMALY DETECTION IN STREAMING GRAPHS

(71) Applicant: Amazon Technologies, Inc., Seattle, WA (US)

(72) Inventors: Dhivya Eswaran, Pittsburgh, PA (US); Sudipto Guha, Jersey City, NJ (US); Nina Mishra, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 451 days.

(21) Appl. No.: 15/892,258

(22) Filed: Feb. 8, 2018

(51) Int. Cl.
  *G06F 16/00* (2019.01)
  *G06F 16/901* (2019.01)
  *G06F 16/21* (2019.01)
  *H04L 29/08* (2006.01)
  *H04L 29/12* (2006.01)

(52) U.S. Cl.
  CPC .......... *G06F 16/9024* (2019.01); *G06F 16/21* (2019.01); *H04L 61/2007* (2013.01); *H04L 67/10* (2013.01)

(58) Field of Classification Search
  CPC ..... G06F 16/21; G06F 16/9024; H04L 67/10; H04L 61/2007
  See application file for complete search history.

(56) References Cited

U.S. PATENT DOCUMENTS

| 2012/0137367 | A1* | 5/2012 | Dupont | G06F 21/00 726/25 |
| 2015/0154262 | A1* | 6/2015 | Yang | G06F 11/1451 707/649 |
| 2018/0103052 | A1* | 4/2018 | Choudhury | G06F 16/9024 |
| 2019/0236371 | A1* | 8/2019 | Boonmee | G06K 9/00765 |

OTHER PUBLICATIONS

DBLP Network Dalaset. https://west.uni-koblenz.de/research/datasets, downloaded Oct. 26, 2020, 2 pages.
NYC Taxi & Limousine Corporatio—Trip Record Data. http://www1.nyc.gov/site/tlc/about/tlc-trip-record-data.page, downloaded Oct. 26, 2020, 3 pages.
Wikimedia Downloads. http://dumps.wikimedia.org. downloaded Oct. 26, 2020, 2 pages.
Akoglu, Leman et al., Opinion Fraud Detection in Online Reviews by Network Effects, In ICWSM, The AAAI Press, 2013, 10 pages.
Akoglu, Leman et al., Oddball: Spotting Anomalies in Weighted Graphs, In PAKDD (2) (Lecture Notes in Computer Science), vol. 6119. 2010, Springer, 410-421, 12 pages.

(Continued)

*Primary Examiner* — Diedra McQuitery
(74) *Attorney, Agent, or Firm* — Nicholson De Vos Webster & Elliott, LLP

(57) ABSTRACT

Techniques for detecting anomalies in streaming graph data are described. For example, an embedding technique of generating a multi-dimensional vector of summations of each weighted edge found in both a random source bounding proper subset and a random destination bounding proper subset associated with a dimension of the epoch graph is detailed. Anomaly detection is performed on the generated multi-dimensional vectors.

20 Claims, 18 Drawing Sheets

(56) References Cited

OTHER PUBLICATIONS

Akoglu, Leman et al., Graph based anomaly detection and description: a suwey, Data Min. Knowl. Discov. 29, 3, 2015, 626-688, 68 pages.
Andersen, Reid and Kumar Chellapilla, Finding dense subgraphs with size bounds, Algorithms and Models for the Web-Graph, 2009, 25-37.
Araujo, Miguel et al., Com2: Fast Automatic Discovery of Temporal ('Comet') Communities, In PAKDD (2) (Lecture Notes in Computer Science), vol. 8444, 2014, Springer, 271-283, 12 pages.
Beutel, Alex et al., CopyCatch: stopping group attacks by spotting lockstep behavior in social networks. In WWW. InternationalWorldWideWeb Conferences Steering Committee/ ACM, 2013, 119-130, 11 pages.
Charikar, Moses, Greedy approximation algorithms for finding dense components in a graph. In APPROX (Lecture Notes in Computer Science), vol. 1913. Springer, 2000, 84-95, 13 pages.
Eswaran, Dhivya et al., ZooBP: Belief Propagation for Heterogeneous Networks, PVLDB 10, 5, 2017, 625-636, 12 pages.
Fischer, Eldar, The Art of Uninformed Decisions, Bulletin of the EATCS, 2001, 36 pages.
Goldberg, Andrew V., Finding a Maximum Density Subgraph, University of California, Berkeley, 1984, 14 pages.
Guha, Sudipta et al., Robust Random Cut Forest Based Anomaly Detection on Streams, in ICML (JMLR Conference and Workshop Proceedings) vol. 48, 2016, 10 pages.
Gupta, Manish et al., Integrating Community Matching and Outlier Detection for Mining Evolutionary Community Outliers, in KDD, ACM, 2012, 9 pages.
Hooi, Bryan et al., Fraudar: Bounding Graph Fraud in the Face of Camouflage, in KDD, ACM, 2016, 10 pages.
Ide, Tsuyoshi and Hisashi Kashima, Eigenspace-Based Anomaly Detection in Computer Systems, in KDD, ACM, 2004, 11 pages.
Jiang, Meng et al., A General Suspiciousness Metric for Dense Blocks in Multimodal Data, in ICDM, IEEE Computer Society, 2015, 6 pages.
Kannan, Ravi and V. Vinay, Analyzing the Structure of Large Graphs, 1999, 10 pages.
Koutra, Danai et al., DeltaCon: A Principled Massive-Graph Similarity Function with Attribution, TKDD, vol. V, No. N, 2016, 38 pages.
Lippmann, Richard P. et al., Results of the DARPA 1998 Offline Intrusion Detection Evaluation, in Recent Advances in Intrusion Detection, 1999, 29 pages.
McGregor, Andrew et al., Densest Subgraph in Dynamic Graph Streams, in MFCS(2) vol. 9235, Springer, 2015, 10 pages.
Pang, Ruoming et al., A First Look at Modern Enterprise Traffic, in Internet Measurement Conference, USENIX Association, 2005, 14 pages.
Pevny, Tomas, Loda: Lightweight On-Line Detector of Anomalies, Machine Learning, 102 (2), 2016, 30 pages.
Prakash, B. Aditya et al., EigenSpokes: Surprising Patterns and Scalable Community Chipping in Large Graphs, in PA KDD (2), vol. 6119, Springer, 2010.
Ranshous, Stephen et al., A Scalable Approach for Outlier Detection in Edge Streams Using Sketch-Based Approximations, is SDM, SIAM, 2016, 9 pages.
Ranshous, Stephen et al., Anomaly Detection in Dynamic Networks: A Survey, Wiley Interdisciplinary Reviews: Computational Statistics, 2015, 25 pages.
Ron, Dana, Property Testing, Combinatorial Optimization-Dordrecht, 2001, 39 pages.
Shah, Neil et al., Spotting Suspicious Link Behavior with fBox: An Adversarial Perspective, in ICDM, IEEE Computer Society, 2014, 10 pages.
Shah, Neil et al., TimeCrunch: Interpretable Dynamic Graph Summarization, in KDD, ACM, 2015, 10 pages.
Shetty, Jitesh and Jafar Adibi,The Enron Email Dataset Database Schema and Brief Statistical Report, Information Sciences Institute Technical Report, University of Southern California, 2004, 7 pages.
Shin, Kijung et al., M-Zoom: Fast Dense-Block Detection in Tensors with Quality Guarantees, in ECML/PKDD (lecture notes in Computer Science), vol. 9851, Springer, 2016, 5 pages.
Shin, Kijung et al., D-Cube: Dense-Block Detection in Terabyte-Scale Tensors, in WSDM, ACM, 2017, 9 pages.
Sricharan, Kumar and Kamalika Das, Localizing Anomalous Changes in Time-Evolving Graphs, in Proceedings of the 2014 ACM SIGMOD International Conference on Management of Data, ACM, 2014, 12 pages.
Sun, Jimeng et al., GraphScope: Parameter-free Mining of Large Time-evolving Graphs, in KDD, ACM, 2007, 10 pages.
Sun, Jimeng et al., Beyond Streams and Graphs: Dynamic Tensor Analysis, in KDD, ACM, 2006, 10 pages.
Wu, Ke et al., RS-Forest: A Rapid Density Estimator for Streaming Anomaly Detection, in ICDM, IEEE Computer Society, 2014, 30 pages.
Xu, Kevin S. et al., Tracking Communities in Dynamic Social Networks, in SBP (lecture notes in computer science), vol. 6589, Springer, 2011.

* cited by examiner

PERFORM EMBEDDING ON A PLURALITY OF GRAPHS TO GENERATE A MULTI-ELEMENT VECTOR (POINT IN EUCLIDIAN SPACE) PER EPOCH GRAPH SUBJECTED TO EMBEDDING 413

FOR EACH DIMENSION OF THE VECTOR, CHOOSE A RANDOM SOURCE BOUNDING PROPER SUBSET AND A RANDOM DESTINATION BOUNDING PROPER SUBSET 601

FOR EACH EDGE IN THE GRAPH AND EACH DIMENSION OF THE VECTOR, DETERMINE WHICH EDGES ARE IN THE RANDOM SOURCE AND DESTINATION BOUNDING PROPER SUBSETA AND SUM THE WEIGHTS OF EACH EDGE THAT IS IN THE RANDOM SOURCE AND DESTINATION BOUNDING PROPER SUBSETS TO GENERATE AN ELEMENT VALUE FOR THE DIMENSION 603

STORE EACH GENERATED ELEMENT VALUE IN THE VECTOR IN THE DATA ELEMENT POSITION FOR THE DIMENSION 605

*FIG. 6*

PERFORM EMBEDDING ON A PLURALITY OF GRAPHS TO GENERATE A MULTI-ELEMENT VECTOR (POINT IN EUCLIDIAN SPACE) PER GRAPH SUBJECTED TO EMBEDDING 413

Parameters: source probability $p$, destination probability $q$, number of dimensions $K$ 1: procedure INITIALIZE ($p, q, K$)
2:     for $k = 1, ..., K$ do
3:         Pick source hash $h_k : S \to \{1, ..., \lceil 1/p \rceil\}$ and destination hash $h'_k : D \to \{1, ..., \lceil 1/q \rceil\}$ independently at random.
4: procedure SUM($G$)
5:     $v \leftarrow 0_K$
6:     for edge $e = (s, d, w)$ in $G$ do
7:         for $k = 1, ..., K$ do
8:             if $h_k(s) == 1$ and $h'_k(d) == 1$ then
9:                 $v_k \leftarrow v_k + w$
10:     return $v$

*FIG. 7*

PERFORM EMBEDDING ON A PLURALITY OF GRAPHS TO GENERATE A MULTI-ELEMENT VECTOR (POINT IN EUCLIDIAN SPACE) PER GRAPH SUBJECTED TO EMBEDDING 413

Parameters: source probability $p$, destination probability $q$, number of dimensions $K$ 1: procedure INITIALIZE ($p, q, K$)
2:     for $k = 1, ..., K$ do
3:         Pick source hash $h_k : S \rightarrow \{1, ..., \lceil 1/p \rceil\}$ and destination hash $h'_k : D \rightarrow \{1, ..., \lceil 1/q \rceil\}$ independently at random.
4: procedure SUM($G$)
5:     $v \leftarrow 0_K$
6:     for $k = 1, ..., K$ do
7:         for each source vertex s where $h_k(s) == 1$ and
8:         for each destination vertex d where $h'_k(d) == 1$ then
9:             $v_k \leftarrow v_k + w(s,d)$   //where $w(s,d)$ is the weight of the edge from $(s,d)$
10:    return $v$

ANOMALY DETECTION IN STREAMING GRAPHS

BACKGROUND

Time-evolving graphs—a graph where both vertices and edges come and go over time—are artifacts generated in many real-world contexts. Examples include pickup and drop-off data collected by ride-hailing services, network communication logs (e.g., IP address A sends p packets to IP address B), instant-messaging logs, and email logs. In many contexts, this data is collected in near real-time.

BRIEF DESCRIPTION OF DRAWINGS

Various embodiments in accordance with the present disclosure will be described with reference to the drawings, in which:

FIG. 6 illustrates embodiments of performing an embedding on a plurality of graphs to generate a multi-element vector.

FIG. 7 illustrates embodiments of embedding represented as code.

FIG. 9 illustrates embodiments of embedding represented as code.

DETAILED DESCRIPTION

Various embodiments of methods, apparatus, systems, and non-transitory computer-readable storage media for identifying an anomaly in streaming data (such as in a time-evolving or streaming graph) are described. According to some embodiments, an anomaly is detected in a graph stream by extracting graph summaries for dimensions of interest for a plurality of graphs and subjecting the extracted graph summaries to anomaly detection.

Detecting anomalies in a time-evolving graph is non-trivial and there are many types of anomalies that one can detect. Embodiments detailed herein are directed to detecting an anomaly of the sudden appearance or disappearance of a dense directed subgraph. An example is a surge of ridership requests from the three terminals at JFK airport to various points where the Macy's Thanksgiving Day parade can be observed in Manhattan. Such a discovery is actionable: it can be used to send more cab drivers to the airport, to present more carpooling options for passengers at the airport to best utilize the drivers that are already there, or to create a plan for how to re-situate excess drivers that will end up at the parade. Another example is a surge of network traffic from a first set of servers to a second set of servers—possibly indicating that the first set of servers has been compromised and the second set is now under attack. Actions may be taken to quarantine the first set of servers so as to contain the attack.

Figure 1:
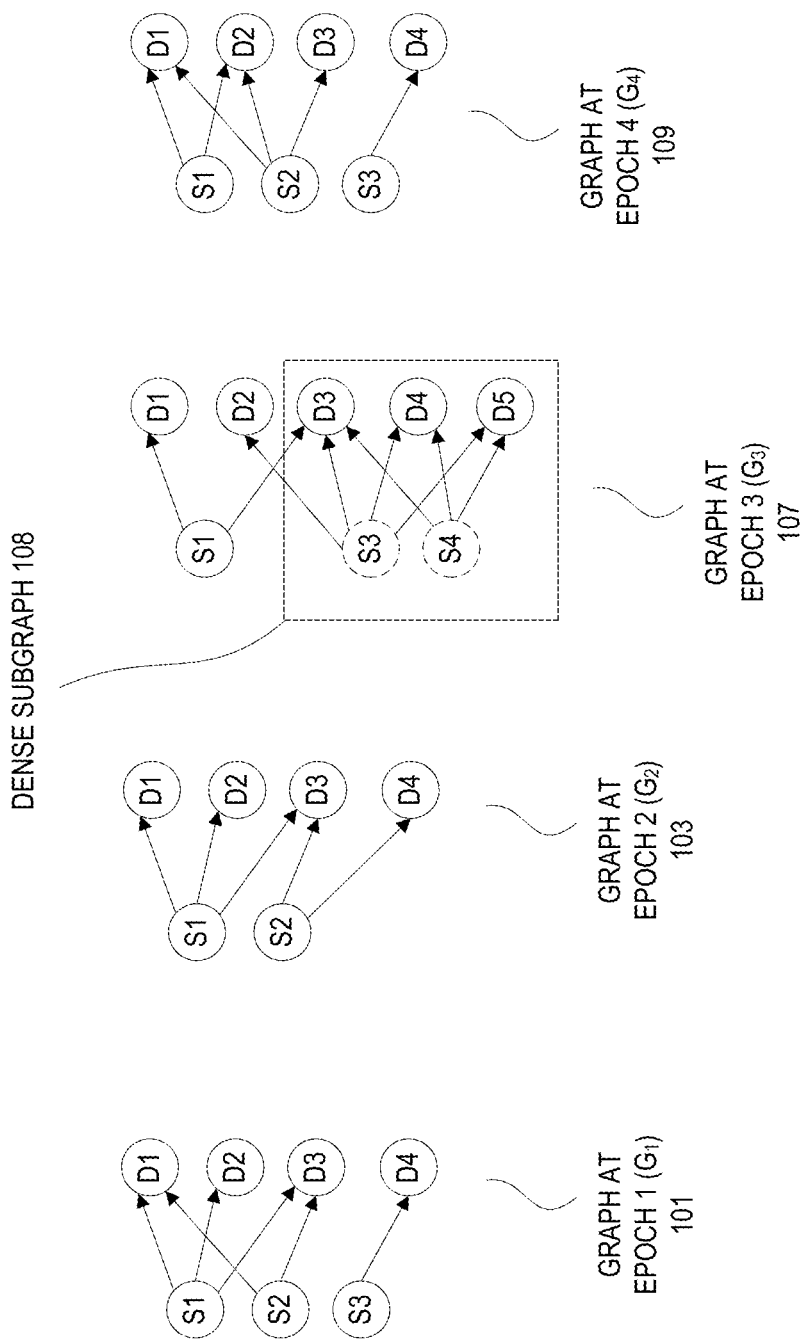
FIG. 1 illustrates an example of a streaming graph over time.

FIG. 1 illustrates an example of a streaming graph over time. In particular, this figure shows a graph G as it evolves over time. In this description, each period of time reflected is an epoch and the graph for an epoch is denoted as $G_{EPOCH\_NUMBER}$. At epoch 1, the graph $G_1$ 101 has several source nodes (S values) and destination nodes (D values) and an indication of a direction of an edge between nodes.

At epoch 2, the graph G has changed to become graph $G_2$ 103. As shown, source node S3 has been removed.

At epoch 3, the graph G has changed to become graph $G_3$ 105. As shown, source node S2 has been removed and nodes S3 and S4 have been added (along with a new destination node D5). These nodes and the edges associated with them are relatively dense compared to the rest of the graph. As such, this is called a "dense subgraph" 108.

At epoch 4, the graph G has changed to become graph $G_4$ 107. As shown, the dense subgraph 108 is now gone.

It is the "sudden" appearance that is of interest as being potentially anomalous compared to past behavior. One technical challenge in detecting the sudden appearance of a dense subgraph in real-time is computational. New edges and vertices are continuously arriving and there is limited time to process the changes. Detailed herein are embodiments that make a "summary" of the graph that reveals newly found/removed dense subgraphs. The summary is an embedding of each epoch graph in a multi-dimensional space where each dimension corresponds to the weight of edges emanating from a random set of source vertices and going to a random set of destination vertices.

Figure 2:
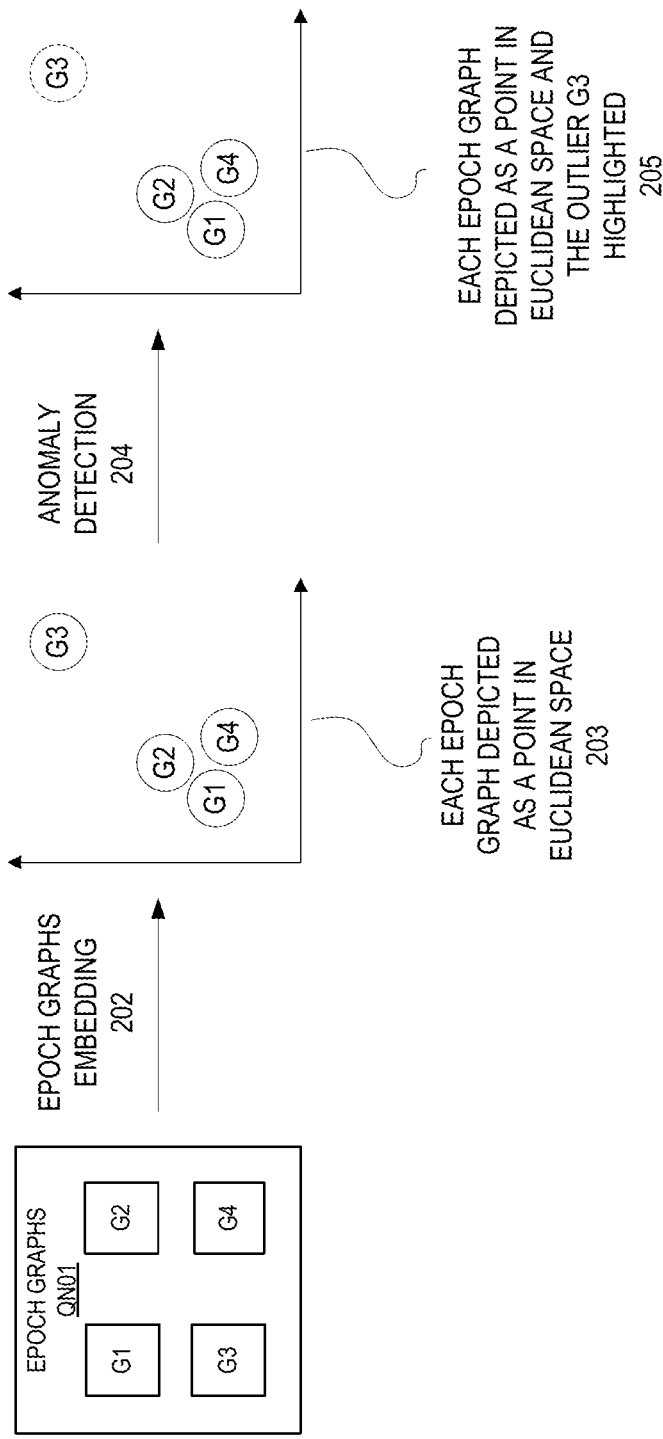
FIG. 2 illustrates the usage of epoch graphs (graph snapshots) in anomaly detection according to some embodiments.

FIG. 2 illustrates the usage of epoch graphs (graph snapshots) in anomaly detection according to some embodiments. As illustrated, a plurality of epoch graphs 201 are stored.

Each of the epoch graphs 201 are subjected to a graph embedding at 202 that generates, per epoch graph, a K-dimensional summary vector (v) which provides coordinates of a point in Euclidean space. In some embodiments, in the K-dimensional summary vector, each dimension provides a value according to a sum of the edge weights in that dimension. Each element of the K-dimensional summary vector therefore represents the interaction between two subgraphs of the epoch graph. In this example of FIG. 2, there are four K-dimensional summary vectors created.

Using the K-dimensional summary vectors, each epoch graph is depicted as a point in Euclidean space at 203. For example, when K is four (4), the K-dimensional summary vector includes four values where each of the values providing a coordinate (e.g., t, x, y, or z). These points are shown as circles G1-G4. Note that while points are shown as plotted, in most cases K-dimensional summary vectors are stored as a part of one or more matrices and manipulations or calculations are performed on these one or more matrices.

Anomaly detection is performed on the points in Euclidean space at 204. Many different anomaly detection algorithms may be used including, but not limited to: robust random cut forest, random cut forest with explanation, and other unsupervised outlier detection schemes.

After anomaly detection is performed at 204, any outliers are provided at 205. In this example, point G3 (corresponding to epoch graph G3) has an outlier. What dimension(s) caused the outlier may be output from the anomaly detection, or found using one or more distance calculations.

Figure 3:
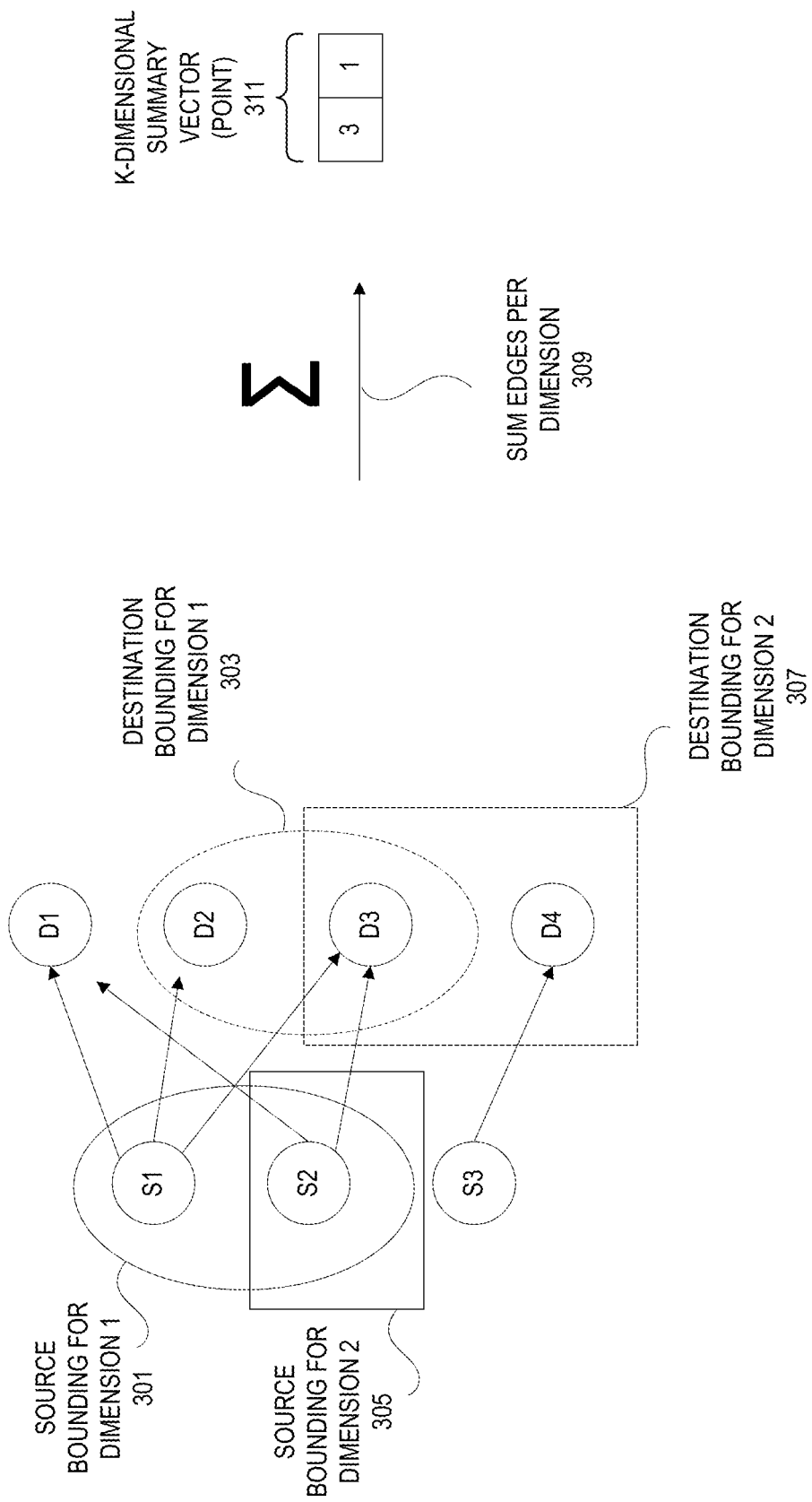
FIG. 3 illustrates an example of embedding for a directional graph according to some embodiments.

FIG. 3 illustrates an example of embedding for a directional graph according to some embodiments. In particular, as shown the graph includes a plurality of source and destination nodes as indicated by the directionality of the edges. Note that a node may be a source and a destination and that bounding proper subsets may overlap. A proper subset is a subset that does not include all members of the set to which it belongs. Notwithstanding the discussion throughout this description, in some embodiments, the bounding subsets are not necessarily proper subsets.

Each element of the K-dimensional summary vector is created by summing edge weights from vertices in the source to vertices in the destination. Prior to generating the elements of the K-dimensional summary vector, a plurality of subgraphs is picked to represent each dimension. These subgraphs are portions of the graph and may include overlapping points.

What constitutes a source and a destination in a subgraph is set by bounding proper subsets such as bounding proper subsets 301-307. In some embodiments, the subgraphs are picked at random according to node sampling probabilities, p for sources and q for destinations.

As shown, each dimension is represented by source and destination bounding proper subsets. In this example, K is equal to 2. For dimension 1, the source bounding proper subset is 301 and the destination bounding proper subset is 303, and for dimension 2, the source bounding proper subset is 305 and the destination bounding proper subset is 307. As shown, subgraph 1 (defined by source bounding proper subset 301 and destination bounding proper subset 303) includes sources 1 and 2 and destinations 2 and 3. Subgraph 2 (defined by source bounding proper subset 305 and destination bounding proper subset 307) includes source 2 and destinations 3 and 4.

There are three edges belonging to the first subgraph and one to the second. These edges are summed at 309 to generate the K-dimensional summary vector 311. In general, each edge has a positive weight and the value in a dimension is the sum of the edge weights from source to destination. In this simple illustration, each edge has the same weight and, as such, the vector is [3, 1].

Figure 4:
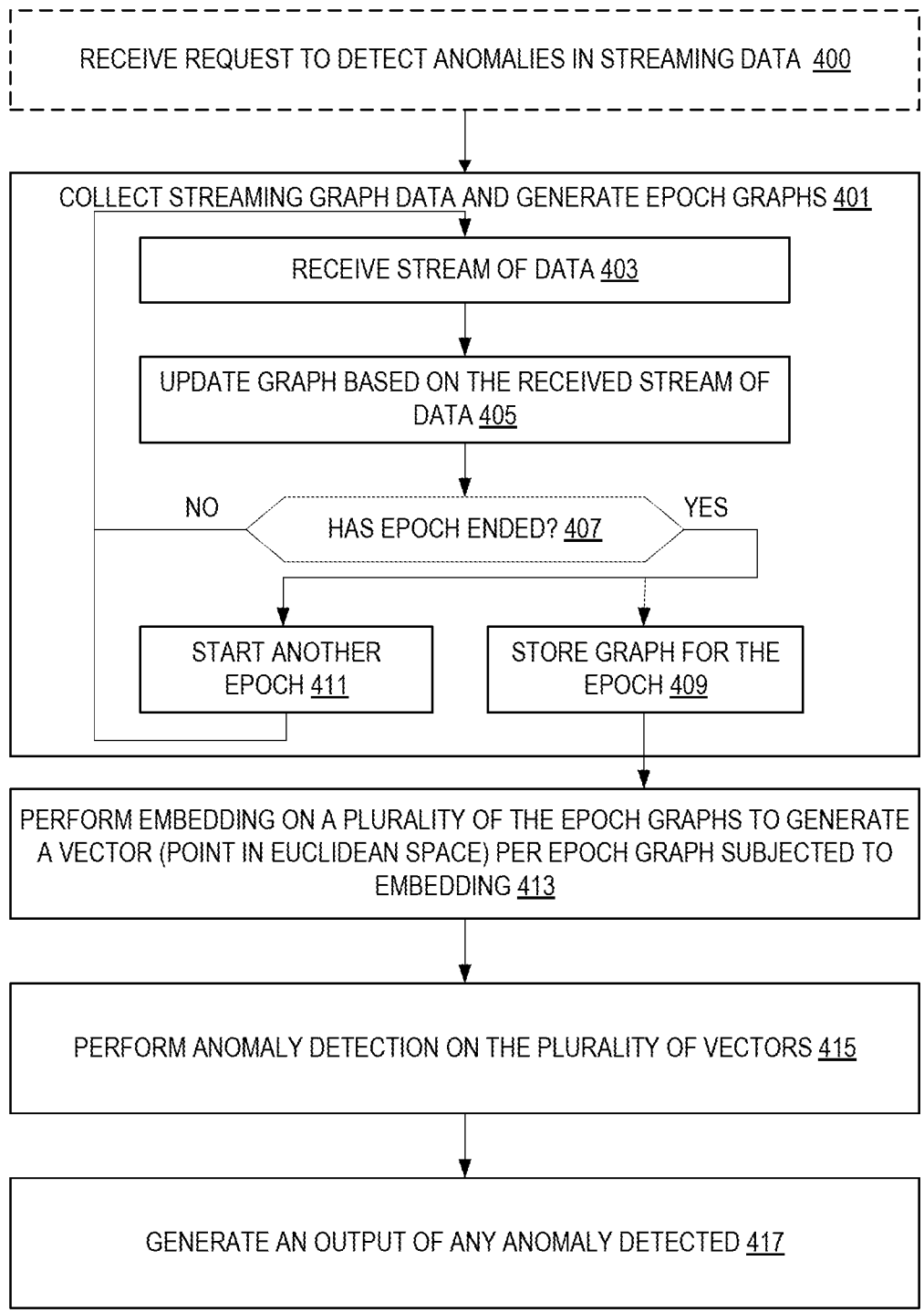
FIG. 4 illustrates embodiments of a method for processing streaming data.

FIG. 4 illustrates embodiments of a method for processing streaming data. In particular, embodiments of this method use embedding on epoch graphs to generate a plurality of K-dimensional summary vectors which are subjected to anomaly detection.

At 400, in some embodiments, a request to detect anomalies in stream is received. For example, a user submits a request with an indication of a data stream that is to be processed for anomalies In some embodiments, the request further includes an indication of how to break up the stream of data (set epochs or periods of time). In some embodiments, the request includes additional information about what type of data (such as protocol used, number of packets, port(s) used, timestamp, etc.) is to be evaluated as a weighted edge and stored as a part of one of more epoch graphs. The request may also indicate which anomaly detection algorithm to utilize.

Streaming data is collected and directional epoch graphs are generated at 401. Graphs are typically stored as one or more matrices. In some embodiments, the streaming data is filtered based on the type of data that is to be evaluated as a weighted edge and only the desired data is kept.

In some embodiments, as streaming data is received at 403, a graph for the streaming data is updated at 405. Updating a graph may include removing a node, adding a node, adjusting a weight of an edge between nodes (for example, updating a number of packets received), etc.

A determination of whether an epoch has ended is made at 407. In other words, has a period of time to break the streaming data into chunks ended? If not, then more streaming data is received at 403, etc. If yes, then the epoch graph is stored at 409, and another epoch graph is started at 403.

In some embodiments, the actions of 407, 409, and 411 are performed on a full graph. In other words, epoch graphs are extracted from a larger graph. In other embodiments, the actions of 407, 409, and 411 are performed as the streaming data is received.

At 413, embedding is performed, per stored epoch graph, to generate K-dimensional summary vectors (one per stored epoch graph). Details of different ways of embedding are detailed elsewhere such as FIGS. 6-9.

At 415, anomaly detection is performed on the generated K-dimensional summary vectors. Anomaly detection computes an anomaly score for each of the vectors. The anomaly score for a record indicates how different it is from the trends that have recently been observed for your stream. For example, robust random cut forest anomaly detection is performed in some embodiments. In some embodiments, an attribution score is also generated per individual elements of the K-dimensional summary vectors. The attribution score is an indication of what dimension in a K-dimensional summary vector was anomalous.

An output detailing aspects of anomalies that are detected is generated at 417. In some embodiments, the output includes a graph (or other diagram) showing any outlier. In some embodiments, the output includes an alarm.

Figure 5:
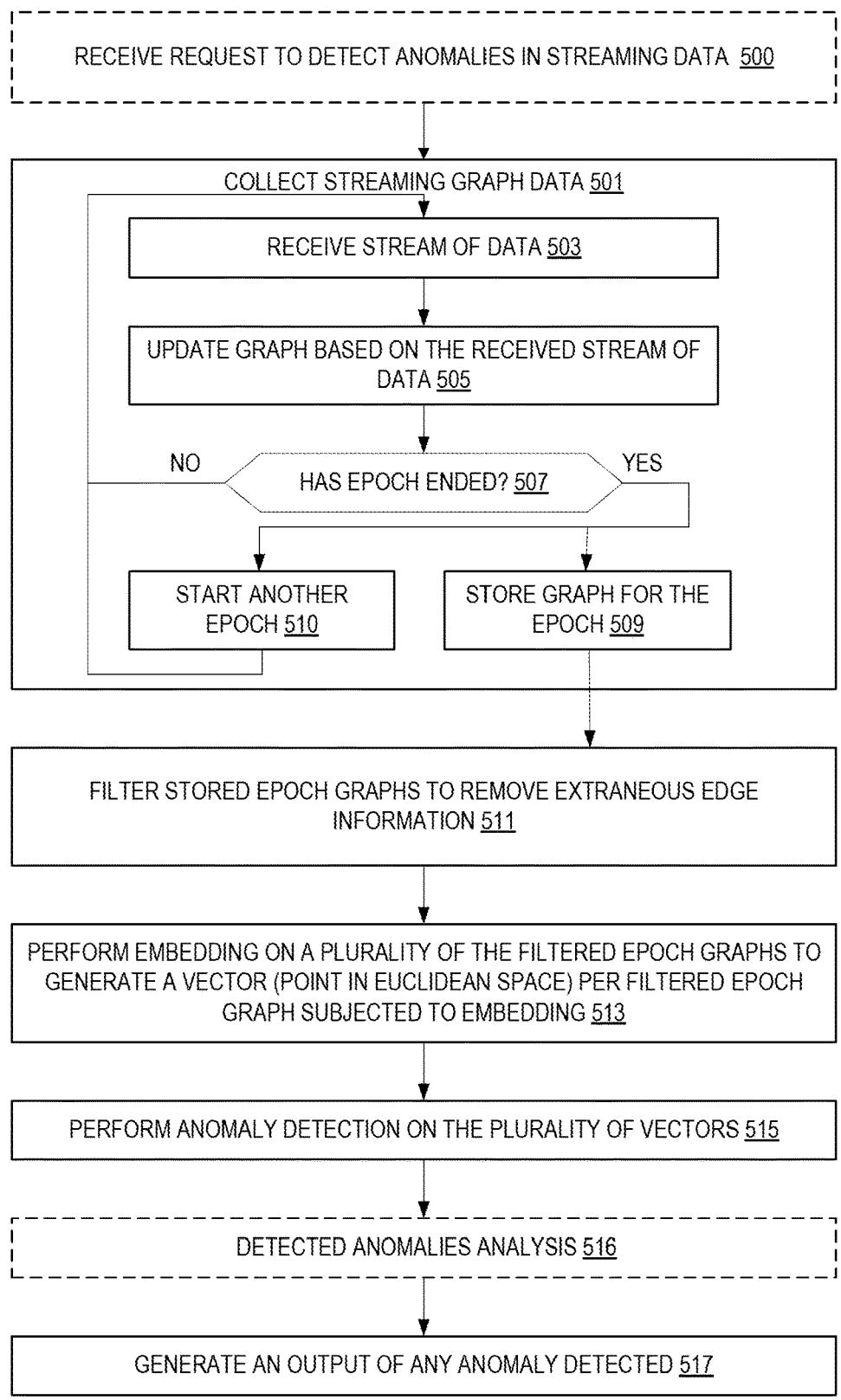
FIG. 5 illustrates embodiments of a method for processing streaming data.

FIG. 5 illustrates embodiments of a method for processing streaming data. In particular, embodiments of this method use embedding on epoch graphs to generate a plurality of vectors which are subjected to anomaly detection.

At 500, in some embodiments, a request to detect anomalies in stream is received. For example, a user submits a request with an indication of a data stream that is to be processed for anomalies In some embodiments, the request further includes an indication of how to break up the stream of data (set epochs or periods of time). In some embodiments, the request includes additional information about what type of data (such as protocol used, number of packets, port(s) used, timestamp, etc.) is to be evaluated as a weighted edge and stored as a part of one of more epoch graphs. The request may also indicate which anomaly detection algorithm to utilize.

Streaming data is collected and directional epoch graphs are generated at 501. Graphs are typically stored as one or more matrices. In some embodiments, the streaming data is filtered based on the type of data that is to be evaluated as a weighted edge and only the desired data is kept.

In some embodiments, as streaming data is received at 503, a graph for the streaming data is updated at 505. Updating a graph may include removing a node, adding a node, adjusting a weight of an edge between nodes (for example, updating a number of packets received), etc.

A determination of whether an epoch has ended is made at 507. In other words, has a period of time to break the streaming data into chunks ended? If not, then more streaming data is received at 503, etc. If yes, then the epoch graph is stored at 509, and another epoch graph is started at 503.

In some embodiments, the actions of 507, 509, and 510 are performed on a full graph. In other words, epoch graphs are extracted from a larger graph. In other embodiments, the actions of 507, 509, and 510 are performed as the streaming data is received.

Stored epoch graphs are filtered to remove extraneous edge information at 511. For example, if the request did not indicate that ports were to be considered, then port information is removed from the weighted edge data for consideration. The filtering of stored epoch graphs generates separate epoch graphs for each non-source/destination data that is to be evaluated. For example, port, source, and destination would make one stored epoch graph, and packets, source, and destination would make a different epoch graph.

At 513, embedding is performed, per filtered epoch graph, to generate K-dimensional summary vectors (one per stored epoch graph). Details of different ways of embedding are detailed elsewhere such as FIGS. 6-9.

At 515, anomaly detection is performed on the generated K-dimensional summary vectors. Anomaly detection computes an anomaly score for each of the vectors. The anomaly score for a record indicates how different it is from the trends that have recently been observed for your stream. For example, robust random cut forest anomaly detection is performed in some embodiments. In some embodiments, an attribution score is also generated per individual elements of the K-dimensional summary vectors. In other words, the attribution score is an indication of what dimension in a K-dimensional summary vector was anomalous.

An analysis of detected anomalies is made at 516 in some embodiments. For example, a union of detected anomalies is made in some embodiments.

An output detailing aspects of anomalies that are detected is generated at 517. In some embodiments, the output includes a graph (or other diagram) showing any outlier. In some embodiments, the output includes an alarm.

FIG. 6 illustrates embodiments of performing an embedding on a plurality of graphs to generate a multi-element vector. In particular, in some embodiments, this is the embedding of 413 or 513.

For each dimension (element) of the multi-element vector, a random source bounding proper subset and a random destination bounding proper subset are chosen at 601. In this example, there are K dimensions. For example, per dimension, a unique source hash $h_k: S \rightarrow \{1, \ldots, [1/p]\}$ and unique destination hash $h'_k: D \rightarrow \{1, \ldots, [1/q]\}$ are chosen independently at 601. In some embodiments, 2K hashes are chosen at random. These hash functions randomly associate each vertex to an integer which denotes the hash bucket (depicted by bounding proper subsets as shown in FIG. 3). The interpretation of a hash bucket is simply a random subset of vertices. Each bucket is a different random subset.

For each edge in the graph and each dimension of the vector, a determination of which edges are in the random source and destination bounding proper subsets and summation of the weights of each edge that is in the random source and destination bounding proper subset is made to generate an element value for that dimension at 603. In some embodiments, edges are evaluated sequentially.

Each generated element value is stored in the multi-element vector in the data element position for the dimension at 605.

FIG. 7 illustrates embodiments of embedding represented as code. First, 2K independent hash functions—which determine the mapping from nodes to query subgraphs—are chosen (lines 1-3), the source functions hashing into [1/p] buckets and the destination functions into [1/q] buckets. Then, each graph is sum (lines 5-10) by processing its edges sequentially, each time updating the relevant dimensions (which hash the source and destination of this edge to 1) by its weight.

Figure 8:
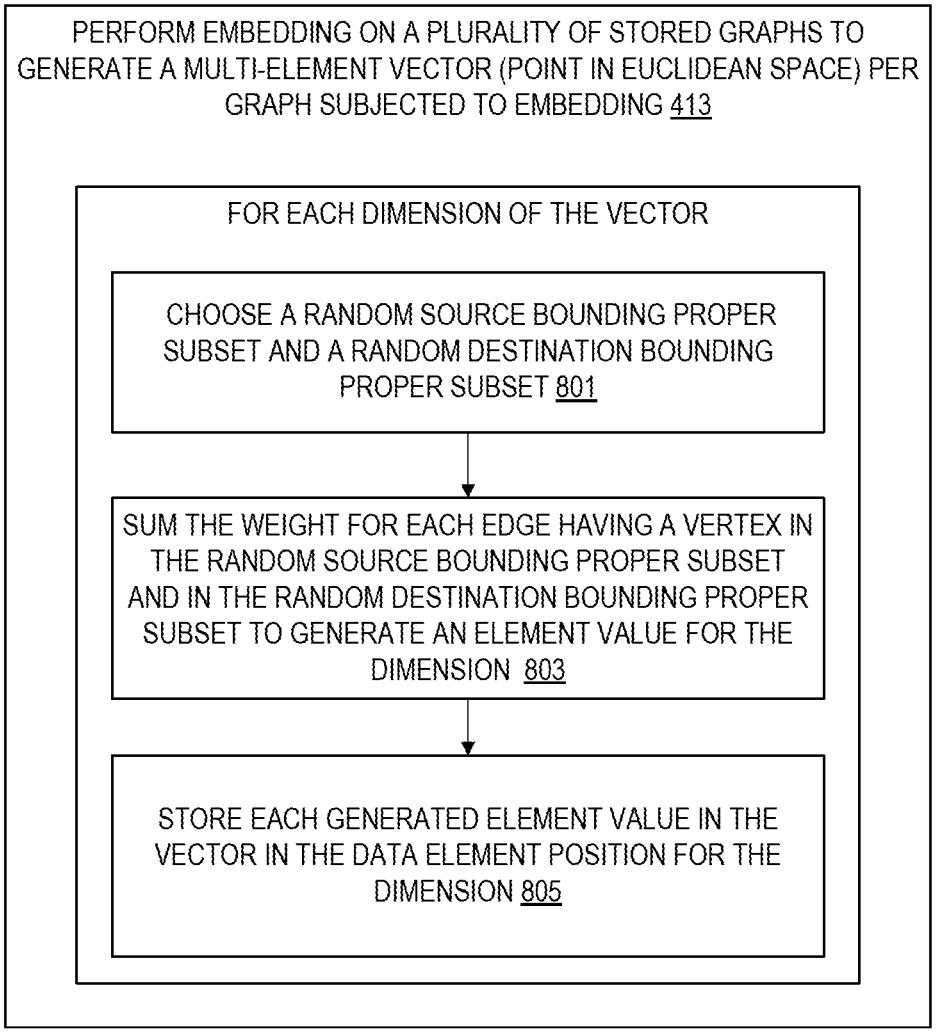
FIG. 8 illustrates embodiments of performing an embedding on a plurality of graphs to generate a multi-element vector.

FIG. 8 illustrates embodiments of performing an embedding on a plurality of graphs to generate a multi-element vector. In particular, in some embodiments, this is the embedding of 413 or 513.

For each dimension (element) of the multi-element vector, a random source bounding proper subset and a random destination bounding proper subset are chosen at 801. In this example, there are K dimensions. For example, per dimension, a unique source hash $h_k: S \rightarrow \{1, \ldots, [1/p]\}$ and unique destination hash $h'_k: D \rightarrow \{1, \ldots, [1/q]\}$ are chosen independently at 801. In some embodiments, 2K hashes are chosen at random. These hash functions map nodes to subgraphs (defined by bounding proper subsets) as shown in FIG. 3.

A summing of each edge having a vertex in the random source bounding proper subset and in the random destination bounding proper subset is performed to generate an element value for the dimension at 803.

Each generated element value is stored in the multi-element vector in the data element position for the dimension at 805.

FIG. 9 illustrates embodiments of embedding represented as code. First, 2K independent hash functions—which determine the mapping from nodes to query subgraphs—are chosen (lines 1-3), the source functions hashing into [1/p] buckets and the destination functions into [1/q] buckets. Then, each graph is sum (lines 4-10) by processing its edges between buckets.

Figure 10:
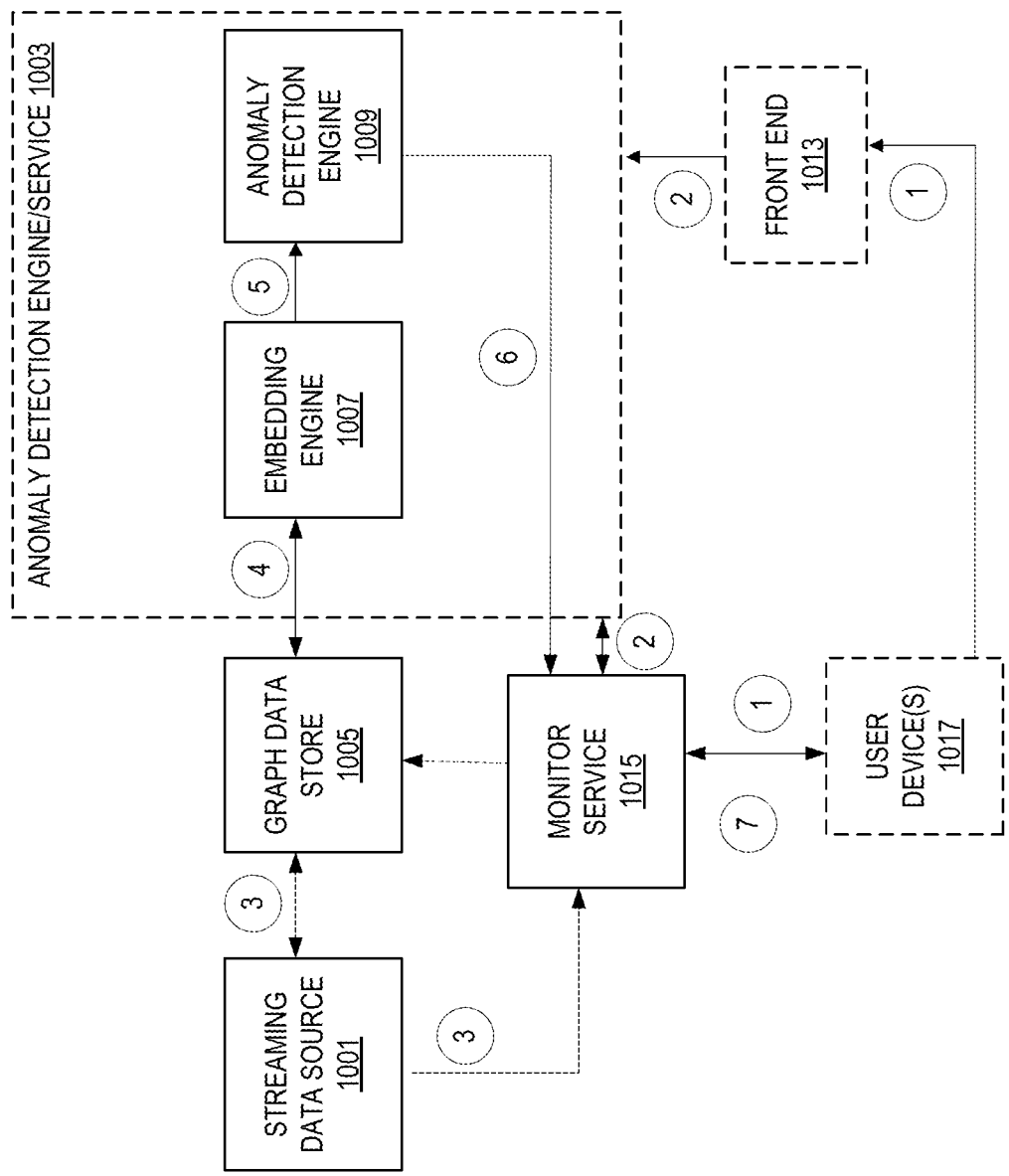
FIGS. 10-12 illustrate embodiments of a system for detecting anomalies in streaming data.

FIG. 10 illustrates embodiments of a system for detecting anomalies in streaming data. A streaming data source 1001 provides data to a graph data store 1005. For example, in some embodiments, the streaming data provides raw data to the graph data store 1005. In some embodiments, a monitor service 1015 is used as an intermediary to provide graph data to the graph data store 1005 from the streaming data source Examples of such data include, but are not limited to: source and destination addresses, port usage, numbers of packets transmitted, timestamps, etc. The streaming data source 1001 may be a part of a server (e.g., a virtual network of devices within a web services provider), an edge device (e.g., a phone, camera, sensors, etc.), combination, etc. In some embodiments, the graph data store 1005 is configured to store epoch graphs from the streaming data it receives such as that detailed in FIGS. 4 and 5 above (e.g., actions 401, 501, and 511 above).

An embedding engine 1007 performs embedding on epoch graphs of the graph data store 1005 to generate k-dimensional vectors as detailed above. For example, in some embodiments, the embedding engine 1007 operates as detailed FIGS. 4, 5 (e.g., actions 413 and 513), 7, and 9 above.

The output of the embedding engine 1007 is fed to an anomaly detection engine 1009. The anomaly detection engine 1009 evaluates the received k-dimensional vectors to attempt to find anomalies (outliers). Examples of such detection have been detailed in FIGS. 4 and 5 above (e.g., actions 415 and 515).

In some embodiments, the embedding engine 1007 and anomaly detection engine 1009 are components of an anomaly detection engine/service 1003.

In some embodiments, a monitor service 1015 takes the results of the detection and presents them to the user. For example, the monitor service 1015 provides a graph showing outliers, generates an alarm, etc.

In some embodiments, the anomaly detection is provided as a part of a web services offering, and a front end 1013 is used to configure the embedding engine 1007 and anomaly detection engine 1009. For example, the front end 1013 receives a request to perform anomaly detection as detailed earlier. In some embodiments, the front end 1013 and monitor service 1015 are combined.

In most embodiments, the front end 1013, embedding engine 1007, anomaly detection engine 1009, and monitor service 1015 are software executing on one or more processors. For example, in some embodiments, this software is a part of a web services offering.

FIG. 10 illustrates circles with numbers in them to denote actions. At circle 1, in some embodiments, a user device 1017 provides configuration of usage of anomaly detection using the embedding engine 1007 and anomaly detection engine 1009, and of the monitor service 1015 for reporting out the results of this detection.

At circle 2, in some embodiments, these components are configured.

The streaming data source(s) 1001 from streaming graph data a circle 3. This data may be directly fed to the graph data store 1005, or through a monitor service 1015 to the graph data store 1005.

At circle 4, the embedding engine 1007 takes the streaming graph data (e.g., epoch graphs) and generates k-dimensional vectors. These k-dimensional vectors are fed to the anomaly detection engine 1009 at circle 5. The anomaly detection engine 1009 performs anomaly detection and provides an output to the monitor service 1015 at circle 6.

A user device 1017 accesses the output from the monitor service 1015 at circle 7. The monitor service 1015 may generate a graph, alarm, etc.

Figure 11:
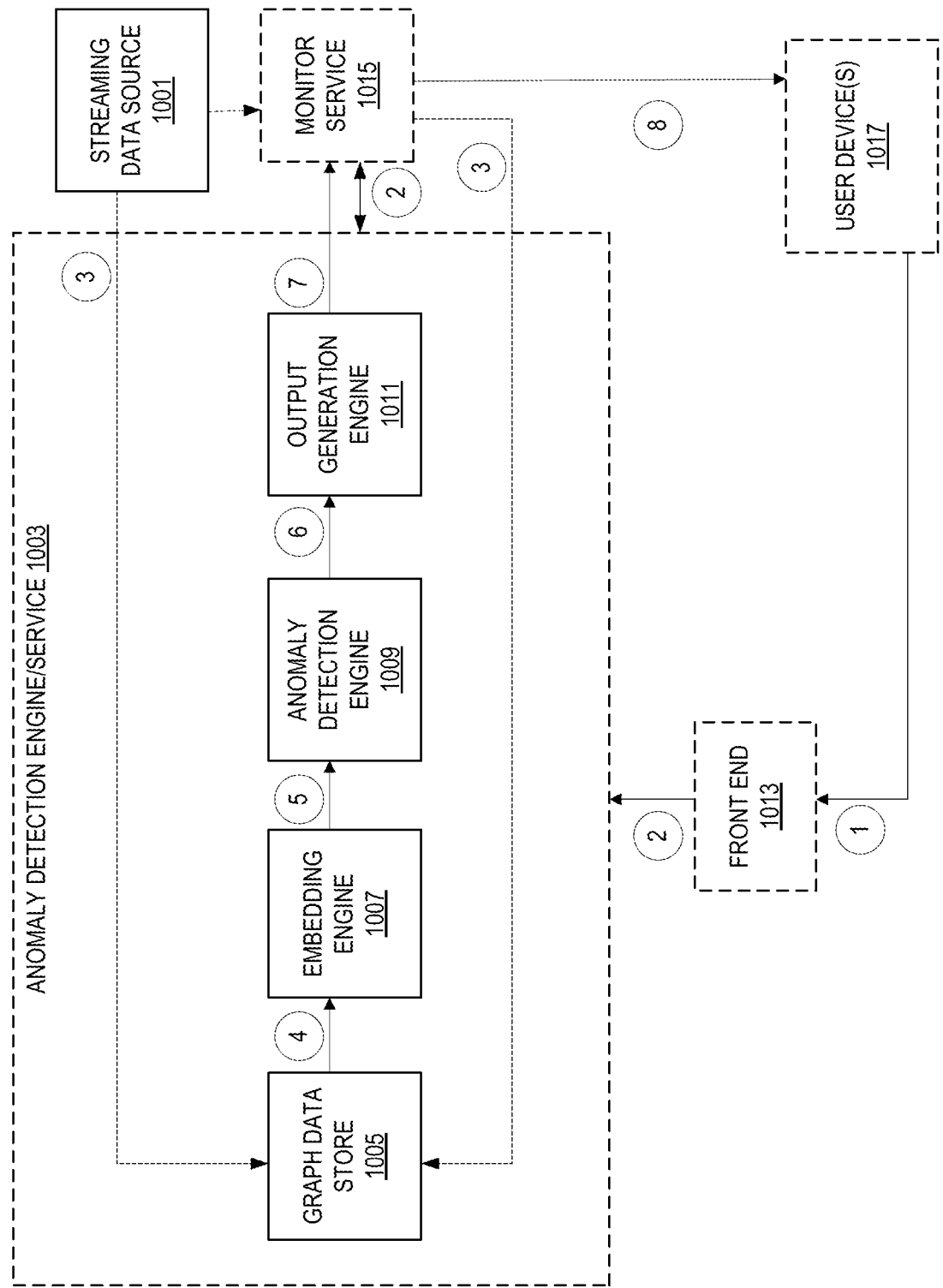

FIG. 11 is similar to FIG. 10, but includes an output generation engine 1011. Additionally, the monitor service 1015 is optional. The output generation engine 1011 generates the graph, or alarm, etc. as detailed above. Further, the graph store 1005, embedding engine 1007, anomaly detection engine 1009, and output generation engine 1011 are all a part of the anomaly detection engine/service 1003 in some embodiments.

The circles with numbers are similar to those of FIG. 10 with the exceptions of circles 6, 7, and 8. At circle 6, detected anomalies are given to the output generation engine 1011 and not the monitor service 1015. The output generation engine 1011 provides this information to the user device at circle 8. This may be through a monitor service 1015 as shown by circle 7.

Figure 12:
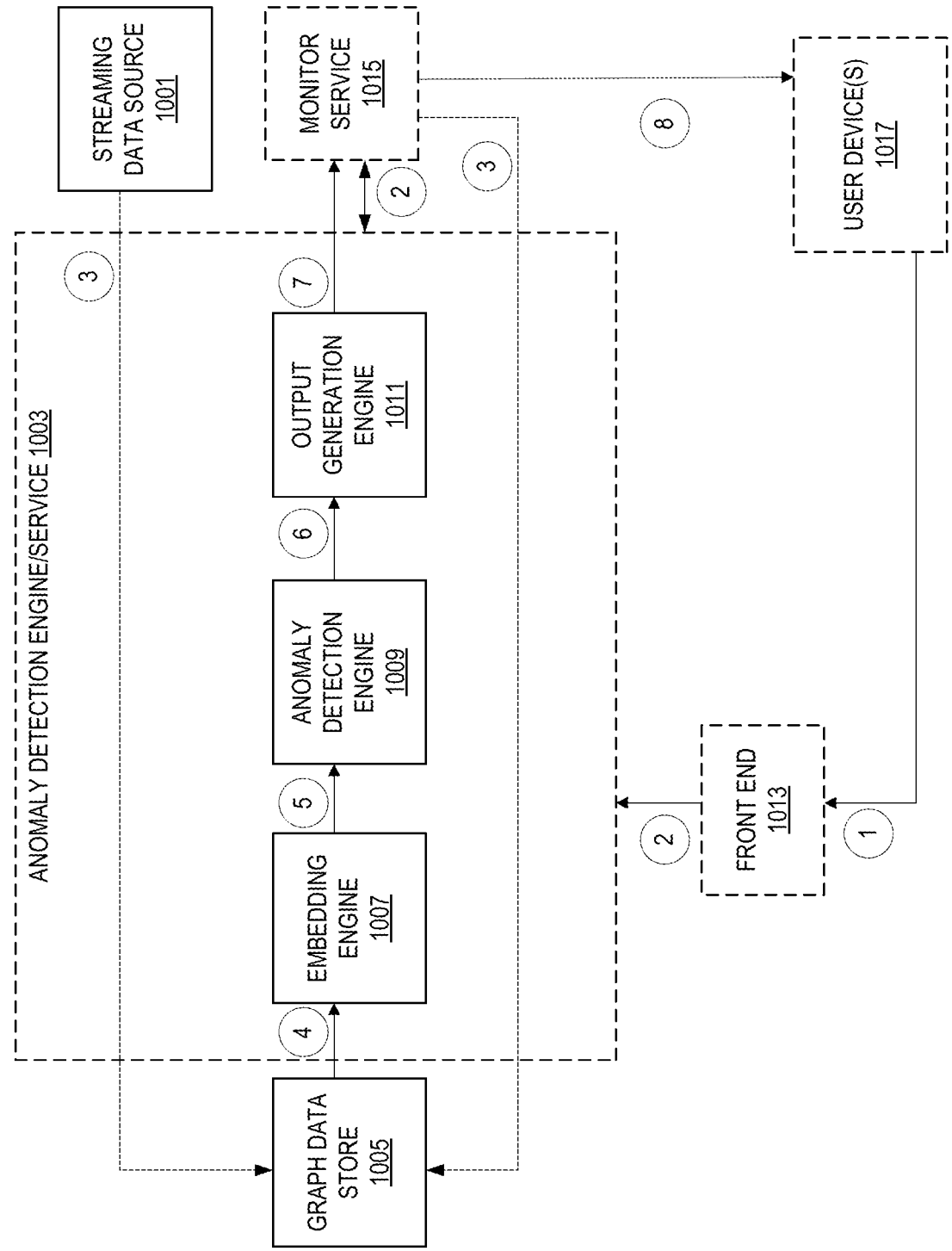

FIG. 12 is similar to FIG. 11, but the graph data store is not included as a part of the anomaly detection engine/service 1003.

Figure 13:
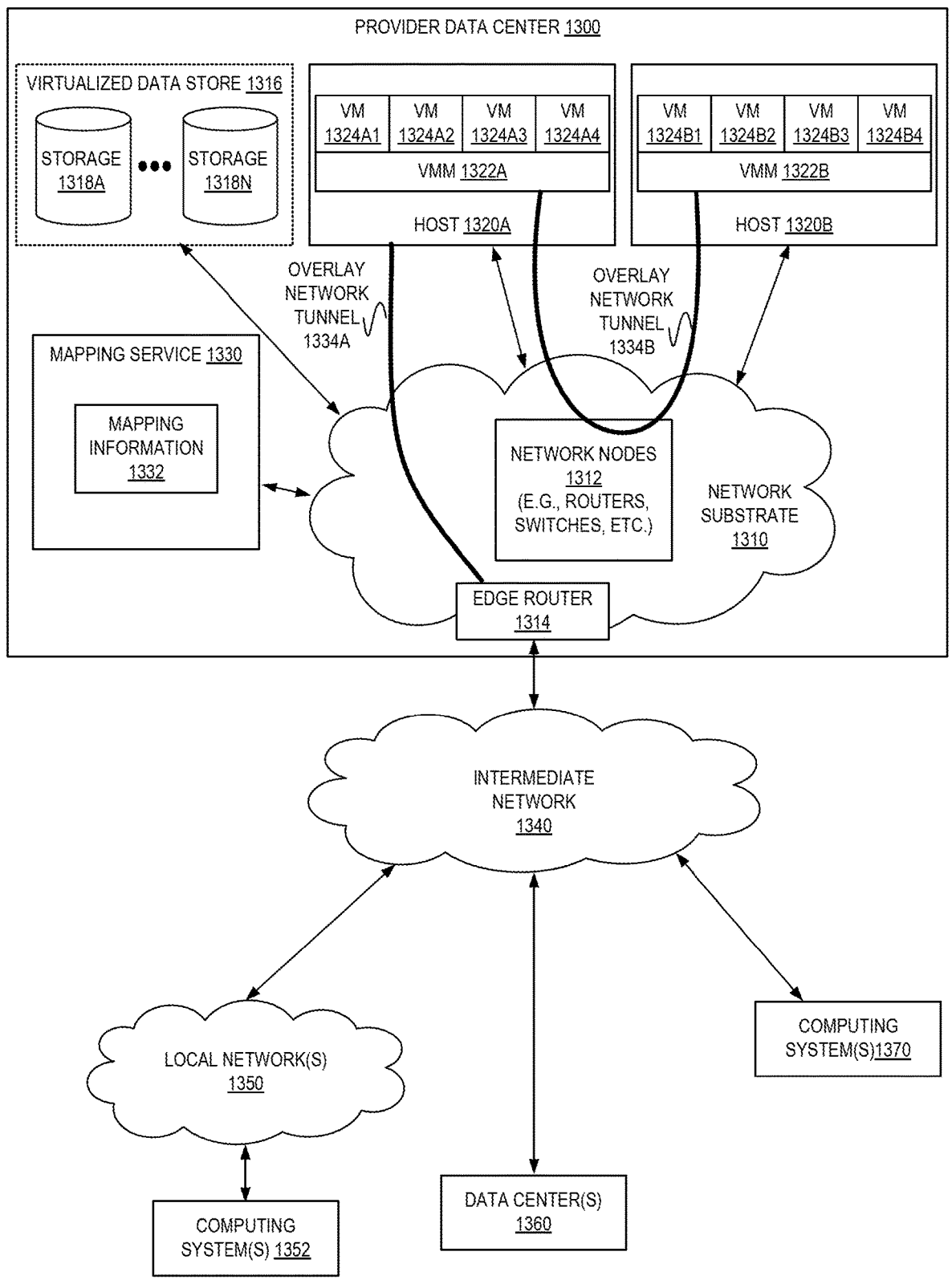
FIG. 13 illustrates an example data center that implements an overlay network on a network substrate using IP tunneling technology according to some embodiments.

FIG. 13 illustrates an example data center that implements an overlay network on a network substrate using IP tunneling technology, according to some embodiments. A provider data center 1300 may include a network substrate that includes networking nodes 1312 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1310 using tunnels. The IP tunneling technology may provide a mapping and encapsulating system for creating an overlay network on a network (e.g., a local network in data center 1300 of FIG. 13) and may provide a separate namespace for the overlay layer (the public IP addresses) and the network substrate 1310 layer (the local IP addresses). Packets in the overlay layer may be checked against a mapping directory (e.g., provided by mapping service 1330) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1330) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 13, an example overlay network tunnel 1334A from a virtual machine (VM) 1324A (of VMs 1324A1-1324A4, via VMM 1322A) on host 1320A to a device on the intermediate network 1350 and an example overlay network tunnel 1334B between a VM 1324A (of VMs 1324A1-1324A4, via VMM 1322A) on host 1320A and a VM 1324B (of VMs 1324B1-1324B4, via VMM 1322B) on host 1320B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 13, at least some networks in which embodiments may be implemented may include hardware virtualization technology that enables multiple operating systems to run concurrently on a host computer (e.g., hosts 1320A and 1320B of FIG. 13), i.e. as virtual machines (VMs) 1324 on the hosts 1320. The VMs 1324 may, for example, be executed in slots on the hosts 1320 that are rented or leased to customers of a network provider. A hypervisor, or virtual machine monitor (VMM) 1322, on a host 1320 presents the VMs 1324 on the host with a virtual platform and monitors the execution of the VMs 1324. Each VM 1324 may be provided with one or more local IP addresses; the VMM 1322 on a host 1320 may be aware of the local IP addresses of the VMs 1324 on the host. A mapping service 1330 may be aware of (e.g., via stored mapping information 1332) network IP prefixes and IP addresses of routers or other devices serving IP addresses on the local network. This includes the IP addresses of the VMMs 1322 serving multiple VMs 1324. The mapping service 1330 may be centralized, for example on a server system, or alternatively may be distributed among two or more server systems or other devices on the network. A network may, for example, use the mapping service technology and IP tunneling technology to, for example, route data packets between VMs 1324 on different hosts 1320 within the data center 1300 network; note that an interior gateway protocol (IGP) may be used to exchange routing information within such a local network.

In addition, a network such as the provider data center 1300 network (which is sometimes referred to as an autonomous system (AS)) may use the mapping service technology, IP tunneling technology, and routing service technology to route packets from the VMs 1324 to Internet destinations, and from Internet sources to the VMs 1324. Note that an external gateway protocol (EGP) or border gateway protocol (BGP) is typically used for Internet routing between sources and destinations on the Internet. FIG. 13 shows an example provider data center 1300 implementing a network that provides resource virtualization technology and that provides full Internet access via edge router(s) 1314 that connect to Internet transit providers, according to some embodiments. The provider data center 1300 may, for example, provide customers the ability to implement virtual computing systems (VMs 1324) via a hardware virtualization service and the ability to implement virtualized data stores 1316 on storage resources 1318A-1318N via a storage virtualization service.

The data center 1300 network may implement IP tunneling technology, mapping service technology, and a routing service technology to route traffic to and from virtualized resources, for example to route packets from the VMs 1324 on hosts 1320 in data center 1300 to Internet destinations, and from Internet sources to the VMs 1324. Internet sources and destinations may, for example, include computing systems 1370 connected to the intermediate network 1340 and computing systems 1352 connected to local networks 1350 that connect to the intermediate network 1340 (e.g., via edge router(s) 1314 that connect the network 1350 to Internet transit providers). The provider data center 1300 network may also route packets between resources in data center 1300, for example from a VM 1324 on a host 1320 in data center 1300 to other VMs 1324 on the same host or on other hosts 1320 in data center 1300.

A service provider that provides data center 1300 may also provide additional data center(s) 1360 that include hardware virtualization technology similar to data center 1300 and that may also be connected to intermediate network 1340. Packets may be forwarded from data center 1300 to other data centers 1360, for example from a VM 1324 on a host 1320 in data center 1300 to another VM on another host in another, similar data center 1360, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1318A-1318N, as virtualized resources to customers of a network provider in a similar manner.

Figure 14:
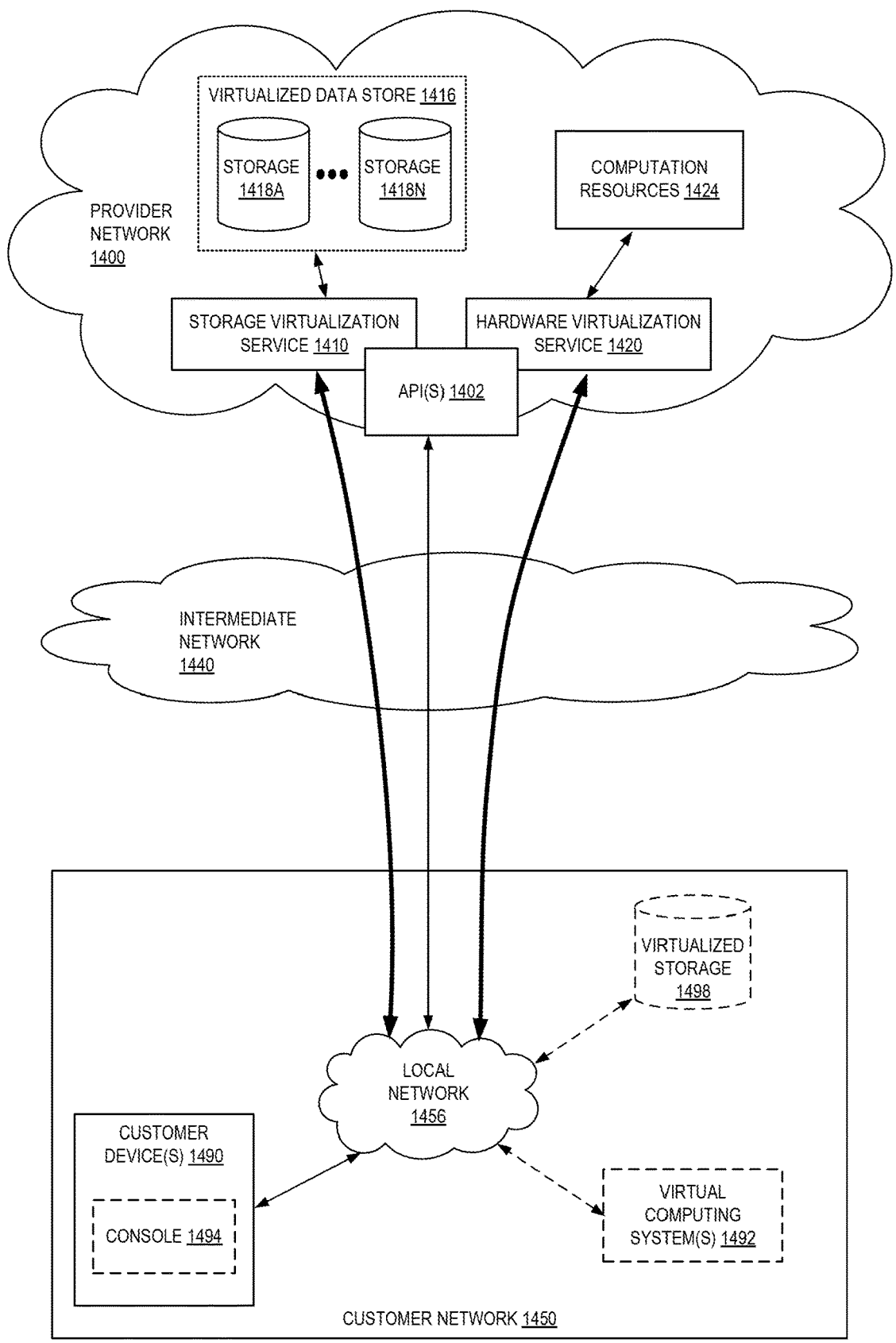
FIG. 14 is a block diagram of an example provider network that provides a storage virtualization service and a hardware virtualization service to customers according to some embodiments.

FIG. 14 is a block diagram of an example provider network that provides a storage virtualization service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage virtualization service 1410, for example via one or more APIs 1402, to access data from and store data to storage resources 1418A-1418N of a virtual data store 1416 provided by the provider network 1400. In some embodiments, a virtualized data store gateway (not shown) may be provided at the customer network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes, which appear to the user as local virtualized storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Figure 15:
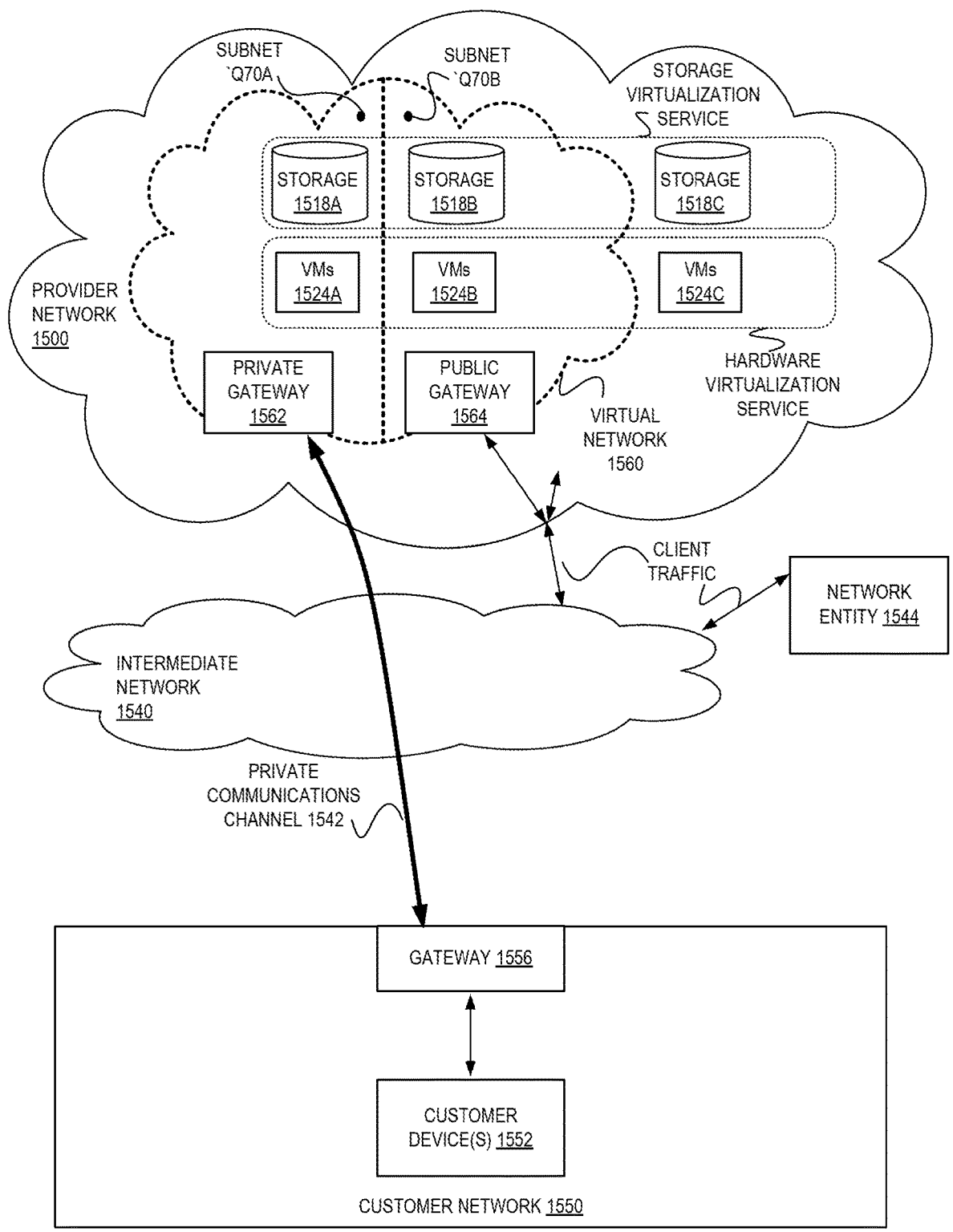
FIG. 15 illustrates an example provider network that provides virtual networks on the provider network to at least some customers according to some embodiments.

FIG. 15 illustrates an example provider network that provides virtual networks on the provider network to at least some customers, according to some embodiments. A customer's virtual network 1560 on a provider network 1500, for example, enables a customer to connect their existing infrastructure (e.g., one or more customer devices 1552) on customer network 1550 to a set of logically isolated resource instances (e.g., VMs 1524A and 1524B and storage 1518A and 1518B), and to extend management capabilities such as security services, firewalls, and intrusion detection systems to include their resource instances.

A customer's virtual network 1560 may be connected to a customer network 1550 via a private communications channel 1542. A private communications channel 1542 may, for example, be a tunnel implemented according to a network tunneling technology or some other technology over an intermediate network 1540. The intermediate network may, for example, be a shared network or a public network such as the Internet. Alternatively, a private communications channel 1542 may be implemented over a direct, dedicated connection between virtual network 1560 and customer network 1550.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1560 for a customer on provider network 1500, one or more resource instances (e.g., VMs 1524A and 1524B and storage 1518A and 1518B) may be allocated to the virtual network 1560. Note that other resource instances (e.g., storage 1518C and VMs 1524C) may remain available on the provider network 1500 for other customer usage. A range of public IP addresses may also be allocated to the virtual network 1560. In addition, one or more networking nodes (e.g., routers, switches, etc.) of the provider network 1500 may be allocated to the virtual network 1560. A private communications channel 1542 may be established between a private gateway 1562 at virtual network 1560 and a gateway 1556 at customer network 1550.

In some embodiments, in addition to, or instead of, a private gateway 1562, virtual network 1560 may include a public gateway 1564 that enables resources within virtual network 1560 to communicate directly with entities (e.g., network entity 1544) via intermediate network 1540, and vice versa, instead of or in addition to via private communications channel 1542.

Virtual network 1560 may be, but is not necessarily, subdivided into two or more subnetworks, or subnets, 1570. For example, in implementations that include both a private gateway 1562 and a public gateway 1564, a virtual network 1560 may be subdivided into a subnet 1570A that includes resources (VMs 1524A and storage 1518A, in this example) reachable through private gateway 1562, and a subnet 1570B that includes resources (VMs 1524B and storage 1518B, in this example) reachable through public gateway 1564.

The customer may assign particular customer public IP addresses to particular resource instances in virtual network 1560. A network entity 1544 on intermediate network 1540 may then send traffic to a public IP address published by the customer; the traffic is routed, by the provider network 1500, to the associated resource instance. Return traffic from the resource instance is routed, by the provider network 1500, back to the network entity 1544 over intermediate network 1540. Note that routing traffic between a resource instance and a network entity 1544 may require network address translation to translate between the public IP address and the local IP address of the resource instance.

Some embodiments may allow a customer to remap public IP addresses in a customer's virtual network 1560 as illustrated in FIG. 15 to devices on the customer's external network 1550. When a packet is received (e.g., from network entity 1544), the network 1500 may determine that the destination IP address indicated by the packet has been remapped to an endpoint on external network 1550 and handle routing of the packet to the respective endpoint, either via private communications channel 1542 or via the intermediate network 1540. Response traffic may be routed from the endpoint to the network entity 1544 through the provider network 1500, or alternatively may be directly routed to the network entity 1544 by the customer network 1550. From the perspective of the network entity 1544, it appears as if the network entity 1544 is communicating with the public IP address of the customer on the provider network 1500. However, the network entity 1544 has actually communicated with the endpoint on customer network 1550.

While FIG. 15 shows network entity 1544 on intermediate network 1540 and external to provider network 1500, a network entity may be an entity on provider network 1500. For example, one of the resource instances provided by provider network 1500 may be a network entity that sends traffic to a public IP address published by the customer.

Illustrative System

Figure 16:
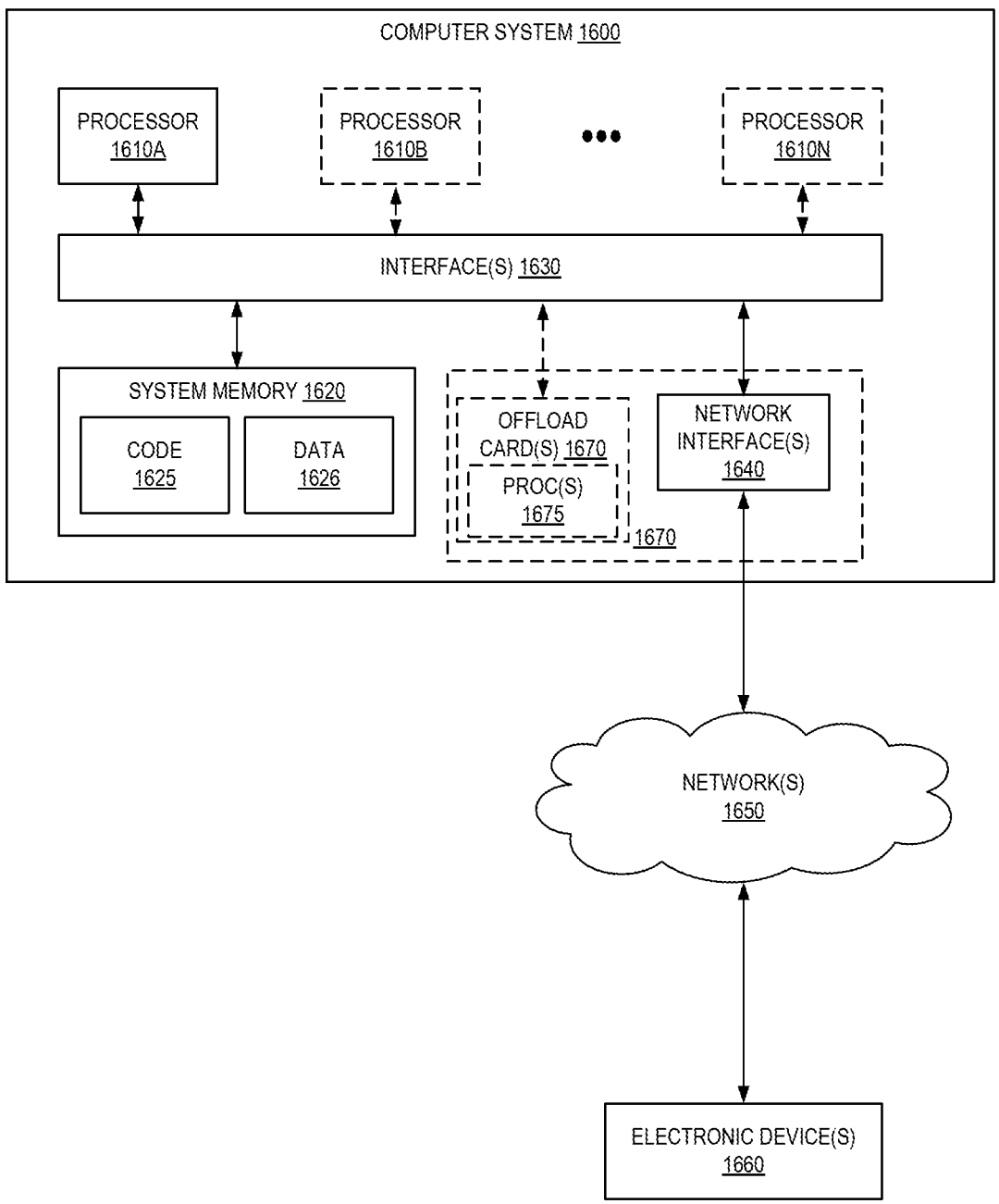
FIG. 16 is a block diagram illustrating an example computer system that may be used in some embodiments.

In some embodiments, a system that implements a portion or all of the techniques for embedding and anomaly detection as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1620 as code 1625 and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities, and may not coordinate with (or service) any hypervisor.

In some embodiments, system memory 1620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Figure 17:
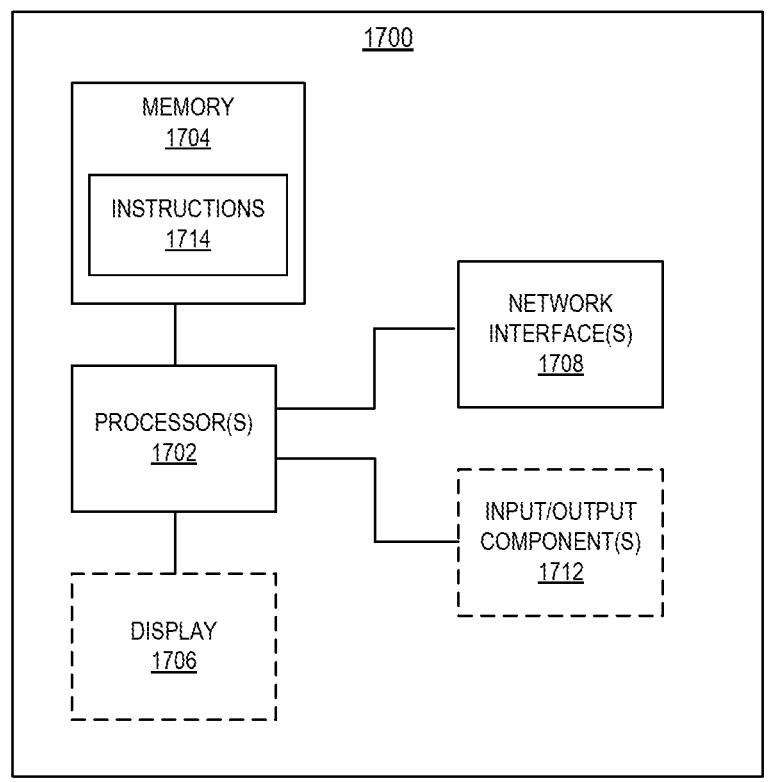
FIG. 17 illustrates a logical arrangement of a set of general components of an exemplary computing device that can be utilized in accordance with various embodiments.

FIG. 17 illustrates a logical arrangement of a set of general components of an example computing device 1700 such as 1003, 1015, 1013, etc. Generally, a computing device 1700 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1702 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1704) to store code (e.g., instructions 1714) and/or data, and a set of one or more wired or wireless network interfaces 1708 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1704) of a given electronic device typically stores code (e.g., instructions 1714) for execution on the set of one or more processors 1702 of that electronic device. One or more parts of various embodiments may be implemented using different combinations of software, firmware, and/or hardware.

A computing device 1700 can include some type of display element 1706, such as a touch screen or liquid crystal display (LCD), although many devices such as portable media players might convey information via other means, such as through audio speakers, and other types of devices such as server end stations may not have a display element 1706 at all. As discussed, some computing devices used in some embodiments include at least one input and/or output component(s) 1712 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 18:
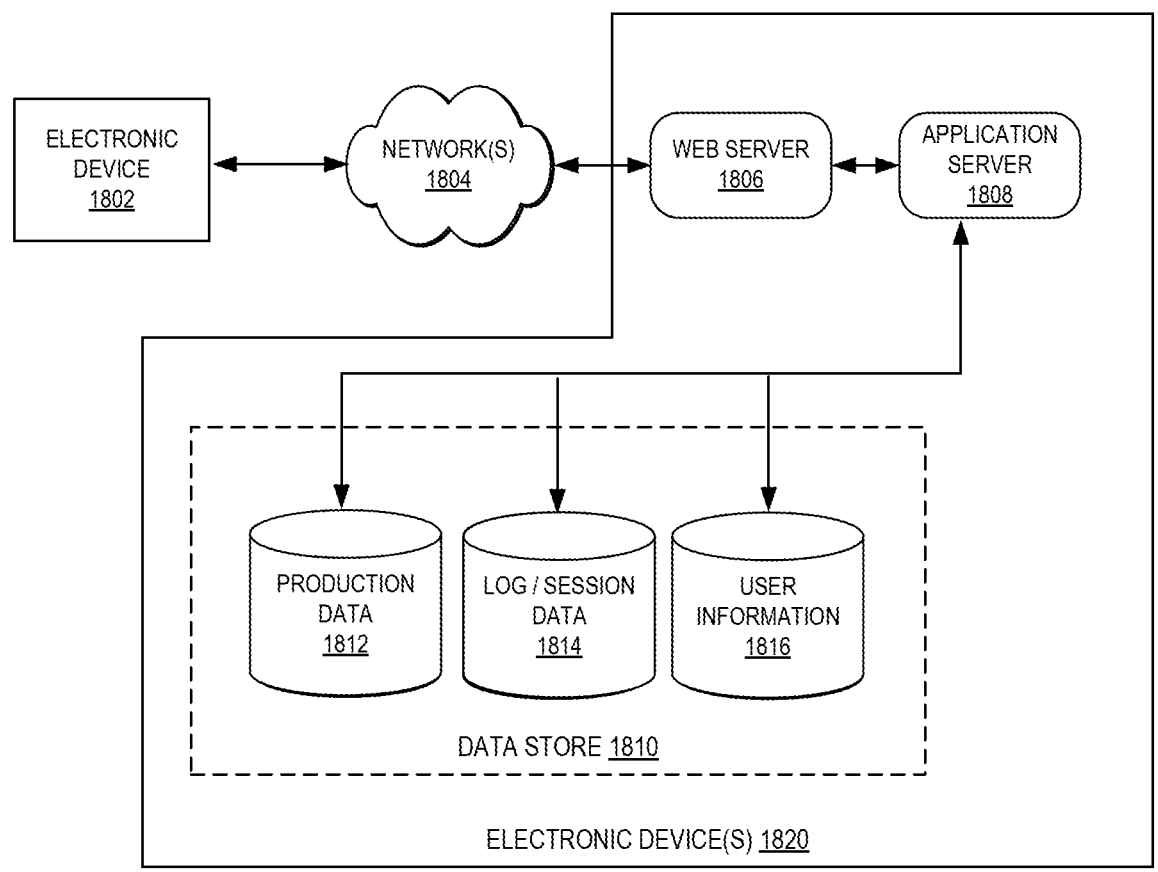
FIG. 18 illustrates an example of an environment for implementing aspects in accordance with various embodiments.

As discussed, different approaches can be implemented in various environments in accordance with the described embodiments. For example, FIG. 18 illustrates an example of an environment for implementing aspects in accordance with various embodiments. For example, in some embodiments the requests are HyperText Transfer Protocol (HTTP) requests that are received by a web server (e.g., web server 1806), and the users, via electronic devices, may interact with the provider network via a web portal provided via the web server 1806 and application server 1808. As will be appreciated, although a web-based environment is used for purposes of explanation, different environments may be used, as appropriate, to implement various embodiments. The system includes an electronic client device 1802, which may also be referred to as a client device and can be any appropriate device operable to send and receive requests, messages or information over an appropriate network 1804 and convey information back to a user of the device 1802. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1804 includes the Internet, as the environment includes a web server 1806 for receiving requests and serving content in response thereto, although for other networks an alternative device serving a similar purpose could be used, as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device 1802 and handling a majority of the data access and business logic for an application. The application server 1808 provides access control services in cooperation with the data store 1810 and is able to generate content such as text, graphics, audio, video, etc., to be transferred to the client device 1802, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1802 and the application server 1808, can be handled by the web server 1806. It should be understood that the web server 1806 and application server 1808 are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store 1810 also is shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store 1810 might access the user information 1816 to verify the identity of the user and can access a production data 1812 to obtain information about items of that type. The information can then be returned to the user, such as in a listing of results on a web page that the user is able to view via a browser on the user device 1802. Information for a particular item of interest can be viewed in a dedicated page or window of the browser.

The web server 1806, application server 1808, and/or data store 1810 may be implemented by one or more electronic devices 1820, which can also be referred to as electronic server devices or server end stations, and may or may not be located in different geographic locations. Each of the one or more electronic devices 1820 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   collecting streaming graph data into a plurality of epoch graphs;
   for each epoch graph, performing an embedding to generate a multi-dimensional vector, wherein each element of the multi-dimensional vector is a summation of each weighted edge found in both a random source bounding subset and a random destination bounding subset associated with a dimension of the epoch graph;
   performing anomaly detection on the generated multi-dimensional vectors; and
   generating an output indicating any anomaly detected.

2. The computer-implemented method of claim 1, wherein each random source bounding subset is selected by an application of a unique hash function to nodes of the epoch graph and the random destination bounding subset is selected by an application of a unique hash function to nodes of the epoch graph.

3. The computer-implemented method of claim 1, further comprising:
   sequentially evaluating, per dimension, each weighted edge of the epoch graph to determine which weighted edges are found in both the random source bounding subset and the random destination bounding subset.

4. A computer-implemented method comprising:
   for each epoch graph of streaming graph data, performing an embedding to generate a multi-dimensional vector, wherein each element of the multi-dimensional vector is a summation of each weighted edge found in both a random source bounding proper subset and a random destination bounding proper subset associated with a dimension of the epoch graph; and
   performing anomaly detection on the generated multi-dimensional vectors.

5. The computer-implemented method of claim 4, wherein each random source bounding proper subset is determined by an application of a unique hash function to nodes of the epoch graph and the random destination bounding proper subset is determined by an application of a unique hash function to nodes of the epoch graph.

6. The computer-implemented method of claim 4, further comprising:
   sequentially evaluating, per dimension, all weighted edges of the epoch graph to determine which weighted edges are found in both the random source bounding proper subset and the random destination bounding proper subset.

7. The computer-implemented method of claim 4, further comprising:
   sequentially evaluating, per dimension, each vertex of the epoch graph to determine which weighted edges are found in both the random source bounding proper subset and the random destination bounding proper subset associated.

8. The computer-implemented method of claim 4, further comprising:
   generating an output indicating any anomaly detected.

9. The computer-implemented method of claim 8, wherein the output is at least one of a graph or an alarm.

10. The computer-implemented method of claim 4, wherein the anomaly detection is a random cut forest algorithm.

11. The computer-implemented method of claim 4, wherein each weighted edge comprises data regarding at least one of: port information, packet information, protocol, or timestamp.

12. The computer-implemented method of claim 4, further comprising:
    filtering each epoch graph of streaming graph data to remove extraneous information prior to performing an embedding.

13. A system comprising:
    storage for a plurality of epoch graphs; and
    an anomaly detection service implemented by a first one or more electronic devices, the anomaly detection service to, for each epoch graph,
        perform an embedding to generate a multi-dimensional vector, wherein each element of the multi-dimensional vector is a summation of each weighted edge found in both a random source bounding proper subset and a random destination bounding proper subset associated with a dimension of the epoch graph, and
        perform anomaly detection on the generated multi-dimensional vectors.

14. The system of claim 13, wherein each random source bounding proper subset is determined by an application of a unique hash function to nodes of the epoch graph and the random destination bounding proper subset is determined by an application of a unique hash function to nodes of the epoch graph.

15. The system of claim 13, wherein the anomaly detection service is further to sequentially evaluate, per dimension, all weighted edges of the epoch graph to determine which weighted edges are found in both the random source bounding proper subset and the random destination bounding proper subset.

16. The system of claim 13, wherein the anomaly detection service is further to sequentially evaluate, per dimension, each vertex of the epoch graph to determine which weighted edges are found in both the random source bounding proper subset and the random destination bounding proper subset associated.

17. The system of claim 13, wherein the anomaly detection service is further to generate an output indicating any anomaly detected.

18. The system of claim 17, wherein the output is at least one of a graph or an alarm.

19. The system of claim 13, wherein the anomaly detection is a random cut forest algorithm.

20. The system of claim 13, wherein each weighted edge comprises data regarding at least one of: port information, packet information, protocol, or timestamp.

* * * * *